Patented Mar. 25, 1947

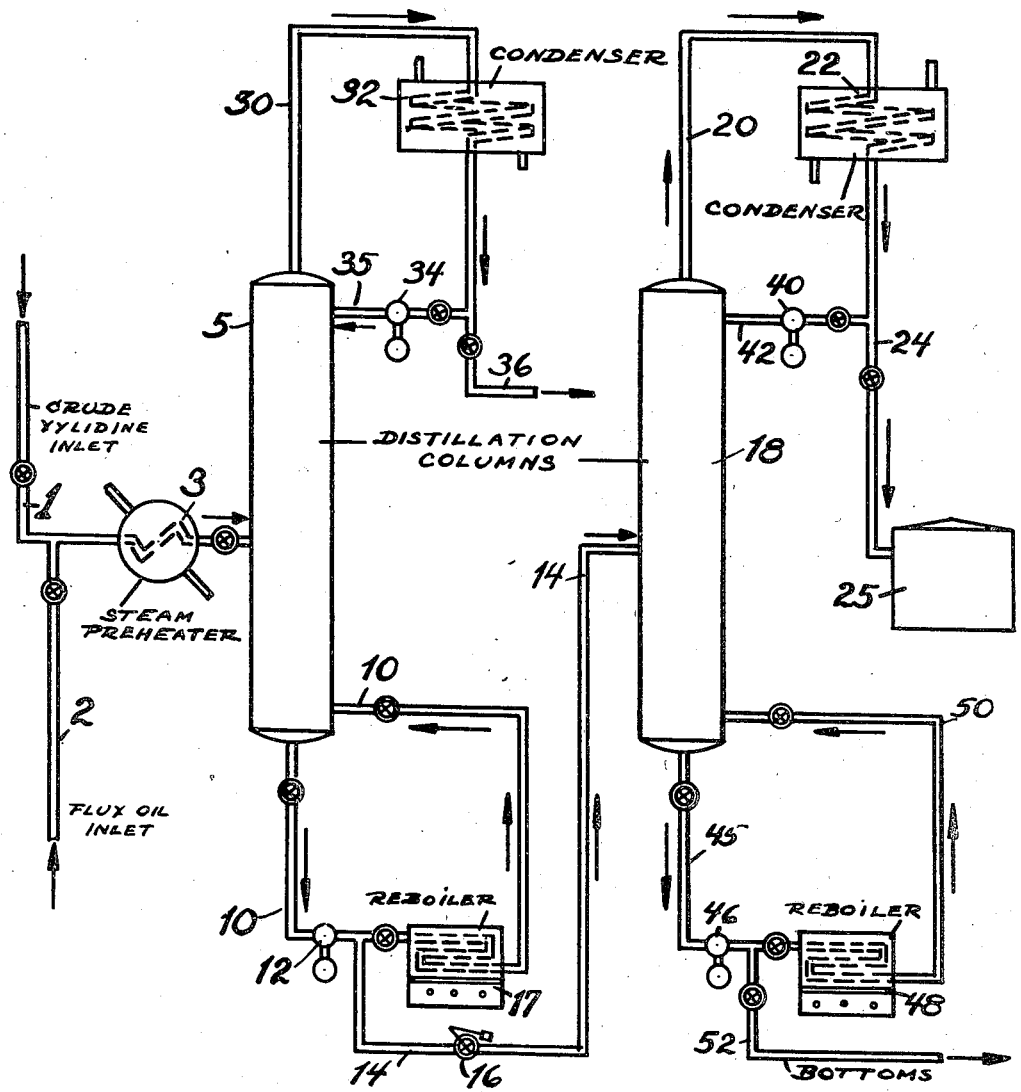

2,417,886

UNITED STATES PATENT OFFICE 2,417,886

DISTILLATION OF CRUDE XYLIDINE

Aaron K. Redcay, Baton Rouge, La., assignor to Standard Oil Development Company, a corporation of Delaware Application September 30, 1943, Serial No. 504,369

7 Claims. (Cl. 202—3)

The present invention relates to improvements in the purification of crude aromatic amines and has for its principal object the separation of hydrogen sulfide and organic sulfur bearing compounds from the said amines.

Recent experimentation and researches have revealed that aromatic amines boiling in the aviation gasoline range are excellent additives to aviation gasoline for when added in amounts ranging from one-half to two per cent by volume of the aviation gasoline, they improved its rich mixture performance under high compression conditions. As a result, the production of aromatic amines on a large commercial scale has become important.

Numerous processes have been developed for producing aromatic amines. For example, aniline has been produced by reducing nitrobenzene in the presence of tin and dilute hydrochloric acid. This reaction goes smoothly. On the other hand, the reduction of nitroxylene to xylidine or of nitrotoluene to toluidine does not proceed in a satisfactory manner.

However, satisfactory processes for reducing the homologues of nitrobenzene have been worked out by prior investigators. Thus, in the application of Edwin J. Gohr, et al., Serial No. 499,768, filed August 24, 1943, there is described and claimed therein, a continuous process for hydrogenating nitroxylene.

In the Gohr et al. application and the numerous other successful processes, the catalyst employed often is a sulfide such as molybdenum sulfide. During the course of the reaction hydrogen sulfide and/or carbon disulfide are continually fed to the reaction zone with the result, of course, that these and other sulfides or sulfur-bearing substances appear in the raw xylidine. It is necessary before this material is incorporated into aviation gasoline to remove essentially all of the sulfur because the presence of excessive sulfur in the aviation gasoline would impede the effect of the lead tetraethyl, also present in the finished aviation gasoline, by chemical reaction.

As indicated, the main object of my invention is to subject a raw xylidine product to a distillation under conditions such that the sulfides and other sulfur-bearing constituents of the raw xylidine may be substantially and completely removed therefrom.

In general, I subject the raw xylidine to a thermal treatment at elevated pressure for a sufficient period of time to decompose and/or convert the sulfur-bearing compounds present in the raw xylidines to hyrogen sulfide or some other easily volatilizable material which may be removed by distillation. The heat treatment I have referred to is carried out in one zone and the unreacted hydrocarbons and hydrogen sulfide or other volatile sulfur compounds are withdrawn from this zone as overhead while the bottoms product containing xylidine is discharged to a second distillation zone operating at a lower pressure and slightly lower temperature, from which zone the xylidine is taken off as overhead product. It will be realized by those familiar with the chemical properties of xylidine that they cannot withstand continued heating at elevated temperatures without undergoing serious impairment in quality and/or decomposition. Consequently, in purifying raw xylidines containing sulfur as is usually necessary where the xylidines are prepared by hydrogenating the aromatic nitro compound in the presence of a sulfide catalyst, and also involving the addition of carbon disulfide and/or hydrogen sulfide to the reaction zone it is necessary that any heat treatment undertaken for the purpose of removing sulfides must be carefully conducted. Consequently, the problem presented to the art was that of removing sulfur bearing compound from xylidines without impairing the quality of the amine.

In the accompanying drawing I have shown diagrammatically a form of distillation equipment and its accessory apparatus in which a preferred modification of my invention may be carried into effect.

Referring in detail to the drawing, crude xylidine is charged to the present system through line 1, mixed with a hydrocarbon oil from line 2 having preferably a boiling range of from about 550 to 600° F., the purpose of this oil being to provide bottoms in a second still 18, subsequently more fully described, then passed through heater 3 and thereafter passed into a distillation column 5. The material is heated by employing reboiler 17 as follows: The bottoms are withdrawn from still 5 through pipe 10 and pumped by pump 12 in part into a heater 17 and thence returned to the still 5. Another portion of the bottoms in line 10 is discharged into a second still 18 via line 14 carrying a pressure reducing valve 16.

In still 18, both the temperature and pressure are somewhat lower than in still 5. Here also the bottoms are withdrawn through line 45 and pumped by pump 46 in part, through reboiler 48 and thence returned to still 18. A portion of the bottoms is rejected from the system through line 52. In this column the temperature is somewhat lower than in the column 5. The purified xylidines are recovered from column 18 through line 20 as overhead, condensed in a condenser 22 and finally collected in storage drum 25.

The overhead vapors from still 5 containing unnitrated hydrocarbons and water are withdrawn through line 30, condensed at 32, and then recycled in part by pump 34 and line 35, the remainder of material being rejected through line 36. Similarly, a portion of the material passing overhead from fractionator 18 is recycled as reflux after condensing in 22 by pump 40 and line 42 to the top of said fractionator.

In a typical distillation I maintained conditions in the distillation as indicated below, with the following results.

EXAMPLE

| | |
|---|---|
| Run No. | D-CS-2 |
| Run hours | 234-281 |

No. 5 tower conditions

| | | |
|---|---|---|
| Feed rate | gallons per hour | 73 |
| Tower pressure | #/sq. in. | 55 |
| Flux oil | gallons per hour | 7.3 |
| Feed temperature | °F | 330 |
| Top temperature | °F | 395 |
| Kettle temperature | °F | 570 |
| Reboiler inlet temperature | °F | 570 |
| Reboiler outlet temperature | °F | 630 |

No. 18 tower conditions

| | | |
|---|---|---|
| Feed rate | gallons per hour | 67 |
| Tower pressure | #/sq. in. | 4 |
| Feed temperature | °F | 460 |
| Top temperature | °F | 455 |
| Bottoms temperature | °F | 520 |
| Reboiler inlet temperature | °F | 505 |
| Reboiler outlet temperature | °F | 570 |

Inspection xylidine product

| | |
|---|---|
| Gravity, specific 60°/60° | 0.9765 |
| Color (S) | +5 |
| Sulfur, wt. % | 0.025 |
| $H_2S$ (lead acetate test) | Pass |
| Amines | 98.7 |
| Corrosion, copper dish | Pass |
| Initial B. P., °F | 412 |
| Final B. P., °F | 428 |

Inspection of flux oil

| | | |
|---|---|---|
| Gravity | °API | 31.0 |
| Aniline pt. | °F | 194 |
| Initial B. P. | °F | 522 |
| 50% at | °F | 607 |
| Final B. P. | | 670 |

The specific details which I have hereinbefore disclosed represent merely a preferred modification of my invention and I may operate with good results within the following range of conditions.

| | Column (5) | Column (18) |
|---|---|---|
| Kettle Temperature | In (17) 530° to 750° F. | In (48) 530° to 750° F. |
| Tower Pressure | 30 to 290 #/Sq. In. | Atmos. to 150 #/Sq. In. |
| Residence Time | ¼ to 10 Hours | ¼ to 10 Hours |

The specific example given above illustrates my process and the same may be applied to the purification of any aromatic amine such as raw aniline, toluidine, etc.

To recapitulate, my invention relates to distilling an aromatic amine containing sulfur compounds and/or sulfur forming compounds, as well as water and hydrocarbons, to purify the amine. In general I subject the amine to multi-stage distillation operating at sufficiently high pressure in the first stage to maintain the amine in liquid phase and for a sufficient period of time to decompose sulfur compounds to more volatile decomposition products. Hence the distillation is a time, temperature pressure operation and, as indicated in the drawing, a good temperature for xylidine distillation in the first stage is about 570° F. under a pressure of about 55 lbs. per sq. in. From this stage, water, hydrocarbon and volatile sulfur compounds are taken off as vapors. In the second stage the xylidines are distilled at somewhat lower temperature say at about 525° F. and under about atmospheric pressure, whence they are taken off as overhead, condensed and collected as a commercially pure product.

Numerous modifications of my invention may be made by those familiar with the art without departing from the spirit of the invention.

What I claim is:

1. The process of purifying raw xylidines produced by the catalytic reduction of nitroxylenes which comprises first, distilling the crude xylidines in a first distillation zone at pressures between 30 and 290 pounds per square inch and temperatures between 530 and 750° F. to vaporize volatile impurities and a residence time between ¼ and 10 hours to permit decomposition of sulfur containing compounds, withdrawing as liquid bottoms a fraction containing the xylidines from said first zone and subjecting the said bottoms to a distillation in a second zone at a pressure substantially lower than that prevailing in the first zone and at a lower temperature, recovering from said second zone xylidines as vapors, condensing the vapors and collecting the condensate.

2. The method specified in claim 1 in which the pressure in the second zone is approximately atmospheric.

3. The multi-stage distillation process of purifying raw aromatic amines containing hydrocarbons, water and sulfur compounds which comprises subjecting the raw amines to distillation in a primary distillation zone under pressures between 30 and 290 pounds per square inch so as to retain the amine in substantial liquid phase but at temperatures between 530 and 750° F. so as to permit vaporization of impurities, withdrawing the amine from the first zone, discharging it into a second distillation zone where it is distilled under a lower pressure than in said first zone and recovering the amine as vapor in substantially pure form from said second zone.

4. The method specified in claim 3 in which the raw amine is xylidine.

5. The method of claim 3 in which the distillation in the second zone is conducted at atmospheric pressure.

6. The method of claim 3 in which the raw amine is permitted to remain in the first zone for a sufficient period of time to permit decomposition of sulfur compounds to decomposition products which are volatilizable under the conditions prevailing in said first zone.

7. The method of distilling raw xylidines containing sulfur compounds boiling in the xylidine range which comprises heating the raw xylidines under 55 pounds per square inch pressure to a temperature of 570° F. in a first zone with a residence time of between one-quarter and ten hours so as to decompose said sulfur compounds and cause their volatilization without volatilization of the xylidines, withdrawing vapors from said zone, withdrawing bottoms containing xylidines from said zone, subjecting the bottoms to distillation at atmospheric pressure and a temperature of 525° F. and recovering xylidine vapors substantially free of sulfur compounds.

AARON K. REDCAY.

REFERENCES CITED

The following references are of record in the file of this patent:

UNITED STATES PATENTS

| Number | Name | Date |
| --- | --- | --- |
| 2,252,099 | Rosen | Aug. 12, 1941 |
| 2,252,928 | Marschner | Aug. 19, 1941 |